US009258218B2

(12) United States Patent
Hampel et al.

(10) Patent No.: US 9,258,218 B2
(45) Date of Patent: Feb. 9, 2016

(54) SOFTWARE-DEFINED NETWORK OVERLAY

(71) Applicants: Georg Hampel, New York City, NY (US); Moritz Steiner, Montclair, NJ (US); Tian Bu, Basking Ridge, NJ (US)

(72) Inventors: Georg Hampel, New York City, NY (US); Moritz Steiner, Montclair, NJ (US); Tian Bu, Basking Ridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 497 days.

(21) Appl. No.: 13/691,317

(22) Filed: Nov. 30, 2012

(65) Prior Publication Data

US 2014/0153572 A1    Jun. 5, 2014

(51) Int. Cl.
*H04L 29/06* (2006.01)
*H04L 12/721* (2013.01)
*H04L 12/715* (2013.01)
*H04L 12/64* (2006.01)

(52) U.S. Cl.
CPC ............ *H04L 45/38* (2013.01); *H04L 12/6418* (2013.01); *H04L 45/64* (2013.01)

(58) Field of Classification Search
CPC combination set(s) only.
See application file for complete search history.

(56) References Cited

U.S. PATENT DOCUMENTS

| 6,601,106 | B1 * | 7/2003 | Moberg et al. ................ 709/238 |
| 6,606,303 | B1 | 8/2003 | Hassel et al. |
| 2003/0110276 | A1 | 6/2003 | Riddle |
| 2005/0086363 | A1 | 4/2005 | Ji |
| 2007/0147397 | A1 | 6/2007 | Aaron et al. |
| 2010/0322141 | A1 | 12/2010 | Liu et al. |

FOREIGN PATENT DOCUMENTS

| WO | WO 2012/160465 | | 11/2012 | |
| WO | WO2013/030693 | * | 3/2013 | ............ H04L 12/911 |
| WO | WO 2013/030693 | | 3/2013 | |

OTHER PUBLICATIONS

Hampel, G., et al., "Applying Software-Defined Networking to the Telecom Domain," *16th IEEE Global Internet Symposium*, Apr. 14, 2013, pp. 3339-3344, XP03244120.

Kempf, J., et al., "Moving the Mobile Evolved Packet Core to the Cloud," *2012 Fifth International Workshop on Selected Topics in Mobile and Wireless Computing*, Oct. 2012, pp. 784-791, XP002717394.

(Continued)

*Primary Examiner* — Fan Ng
(74) *Attorney, Agent, or Firm* — Wall & Tong, LLC

(57) ABSTRACT

A software-defined network overlay capability is configured to control one or more overlay networks using software-defined networking (SDN) in which control functions and forwarding functions are separated. The software-defined network overlay capability may be configured to vertically move packets across network layers, e.g., into an overlay network (e.g., into a tunnel via encapsulation), out of an overlay network (e.g., out of a tunnel via decapsulation), or the like. The software-defined network overlay capability may be configured to move packets from native forwarding infrastructure into an overlay network, between overlay networks (e.g., into a first overlay network from a second overlay network without leaving the second overlay network, out of a first overlay network and into a second overlay network, out of a first overlay network while remaining within a second overlay network, or the like), from an overlay network onto native forwarding infrastructure, or the like.

21 Claims, 6 Drawing Sheets

(56) References Cited

OTHER PUBLICATIONS

"OpenFlow Switch Specification," *Open Networking Foundation*, Jun. 25, 2012, pp. 1-83, Version 1.3.0, XP002692656.

International Search Report and Written Opinion for International Patent Application Serial No. PCT/US2013/071365, mailed Feb. 12, 2014, consists of 12 unnumbered pages.

* cited by examiner

SOFTWARE-DEFINED NETWORK OVERLAY

TECHNICAL FIELD

The disclosure relates generally to communication networks and, more specifically but not exclusively, to supporting tunneling via communication networks.

BACKGROUND

In general, the Internet protocol (IP)—which has inherent advantages such as high bandwidth efficiency, low cost, robustness, and scalability—has become the generic protocol that is typically used for data transport across communication networks. In many cases, however, IP also has associated disadvantages, such as location-based routing of IP lacking compliance with user mobility, best-effort forwarding of IP failing to support differentiated services with service-specific charging and quality-of-service (QoS) enforcement, and lack of support for overlay networks such as Virtual Private Networks (VPNs).

While at least some standards bodies (e.g., Third Generation Partnership Project (3GPP), 3GPP2, Internet Engineering Task Force (IETF), or the like) have introduced protocols (e.g., Mobile IP, Generic Transfer Protocol (GTP), IP Security (IPsec), and the like) to create overlay networks on top of the IP forwarding infrastructure, such overlays networks tend to introduce many types of specialized nodes (e.g., Home Agents (HAs), Foreign Agents (FAs), Radio Network Controllers (RNCs), NodeBs, Serving General Packet Radio Service (GPRS) Support Nodes (SGSNs), Gateway GPRS Support Nodes (GGSNs), eNodeBs, Serving Gateways (SGWs), Packet Data Network (PDN) Gateways (PGWs), Mobility Management Entities (MMEs), security gateways, other types of gateways, and the like) which define the tunnel endpoints that form the overlay networks on top of the IP forwarding infrastructure.

SUMMARY OF EMBODIMENTS

Various deficiencies in the prior art may be addressed by embodiments for supporting a software-defined network overlay.

In one embodiment, an apparatus includes a processor and a memory communicatively connected to the processor. The processor is configured to determine a data flow definition for a data flow, where the data flow definition is based on one or more protocol header fields of one or more protocols and the one or more protocols include one or more network layer protocols or one or more transport layer protocols. The processor is configured to determine one or more tunneling actions to be performed for the data flow, where the one or more tunneling actions include at least one of an encapsulation action or a decapsulation action. The processor is configured to propagate, toward a forwarding element, control information indicative of the data flow definition and the one or more tunneling actions. The apparatus may be a control element or a portion of a control element.

In one embodiment, a method includes using a processor for determining a data flow definition for a data flow, determining one or more tunneling actions to be performed for the data flow, and propagating, toward a forwarding element, control information indicative of the data flow definition and the one or more tunneling actions. The data flow definition is based on one or more protocol header fields of one or more protocols and the one or more protocols include one or more network layer protocols or one or more transport layer protocols. The one or more tunneling actions include at least one of an encapsulation action or a decapsulation action.

In one embodiment, an apparatus includes a processor and a memory communicatively connected to the processor. The processor is configured to receive control information from a control element. The control information includes a data flow definition for a data flow and one or more tunneling actions to be performed for the data flow. The data flow definition is based on one or more protocol header fields of one or more protocols. The one or more protocols include one or more network layer protocols or one or more transport layer protocols. The one or more tunneling actions comprise at least one of an encapsulation action or a decapsulation action. The processor is configured to process a packet of the data flow based on the control information. The apparatus may be a forwarding element or a portion of a forwarding element.

In one embodiment, a method includes using a processor for processing a packet of a data flow. The method includes receiving control information from a control element. The control information includes a data flow definition for the data flow and one or more tunneling actions to be performed for the data flow. The data flow definition is based on one or more protocol header fields of one or more protocols. The one or more protocols include one or more network layer protocols or one or more transport layer protocols. The one or more tunneling actions comprise at least one of an encapsulation action or a decapsulation action. The method includes processing a packet of the data flow based on the control information.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

Figure 1:
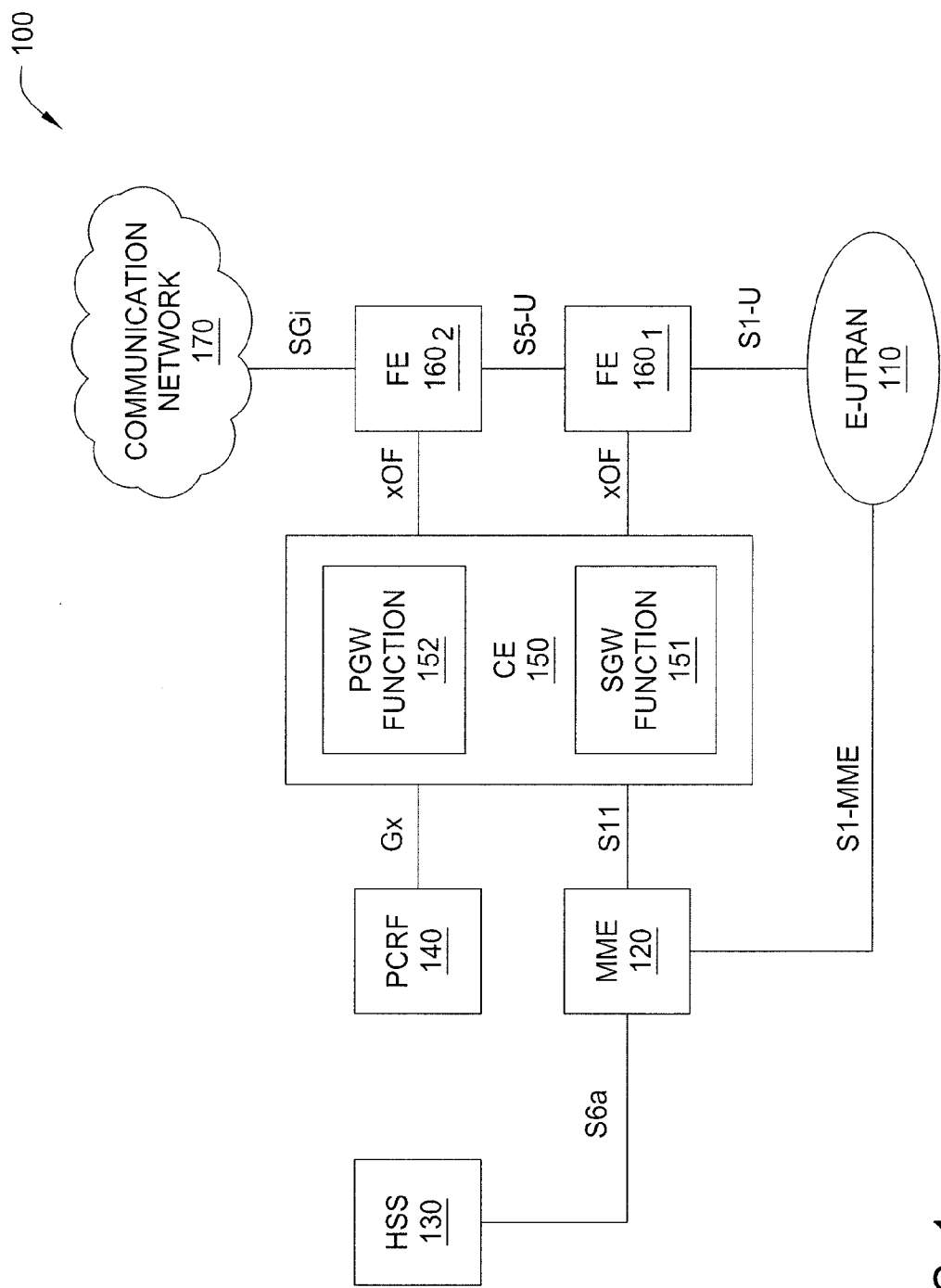
FIG. 1 depicts an exemplary communication system configured to support a software-defined overlay network.

In general, a software-defined network overlay capability is depicted and described herein.

In at least some embodiments, the software-defined network overlay capability is configured to apply software-defined networking (SDN) to one or more overlay networks, provided over a communication infrastructure, in order to form one or more software-defined overlay network.

In at least some embodiments, a SDN is a type of network in which the control plane is separated from the data plane and flow-based forwarding of traffic is supported. In a SDN, the data plane is implemented using one or more forwarding elements (e.g., switches, routers, or the like) and the control plane is implemented using one or more control elements (e.g., servers or the like) which are separate from the forwarding elements. The control element(s) assigns flow-based forwarding rules to the forwarding element(s). The separation of control plane functions and forwarding plane functions enables use of control elements optimized for handling control plane functions (e.g., elements configured to be updated to support new feature sets) and forwarding elements optimized for handling data plane functions (e.g., hardware-based elements configured to support high data throughput). It will be appreciated that any scale limitations which may be associated with SDN are expected to be obviated given that a communication system using an overlay network typically has less forwarding nodes than a communication system without an overlay network.

In at least some embodiments, an overlay network is a type of network that utilizes tunneling in order to support enhanced features which may not be able to be provided (or easily provided) by the underlying network infrastructure on which the overlay network is provided. For example, an overlay network may be used to support service differentiation (e.g., different quality-of-service handling of different traffic flows or different types of traffic flows, application of different policy or charging functions for different traffic flows or different types of traffic flows, or the like, as well as various combinations thereof), security functions, mobility functions, virtual private networking (VPN), or the like. Many types of overlay networks provide various other capabilities. It will be appreciated that overlay networks may utilize tunneling, which may include use of encapsulation/decapsulation actions, to provide such functions. In at least some embodiments, overlay networks may be provided using one or more protocols at the network layer, one or more protocols at the transport layer, one or more protocols configured to operate in conjunction with one or more network layer or transport layer protocols, or the like. Examples of protocols which may be used to provide an overlay network include the Internet Protocol (IP) (e.g., IPv4, IPv6, IPv6 Extension Headers, or the like), Generic Routing Encapsulation (GRE), the General Packet Radio Service (GPRS) Tunneling Protocol (GTP), the User Datagram Protocol (UDP), the Transmission Control Protocol (TCP), the Stream Control Transmission Protocol (SCTP), the Datagram Congestion Control Protocol (DCCP), the Encapsulating Security Payload (ESP) protocol of the IP Security (IPSec) protocol suite, the Authentication Header (AH) protocol of the IPSec protocol suite, or the like.

In at least some embodiments, the software-defined network overlay capability may be configured to control one or more overlay networks using software-defined networking (SDN) in which control functions and forwarding functions are separated. In at least some embodiments, the software-defined network overlay capability may be configured to vertically move packets across network layers, e.g., into an overlay network (e.g., into a tunnel via encapsulation), out of an overlay network (e.g., out of a tunnel via decapsulation), or the like. In at least some embodiments, the software-defined network overlay capability may be configured to move packets from native forwarding infrastructure into an overlay network, between overlay networks (e.g., into a first overlay network from a second overlay network without leaving the second overlay network, out of a first overlay network and into a second overlay network, out of a first overlay network while remaining within a second overlay network, or the like), from an overlay network onto native forwarding infrastructure, or the like.

In at least some embodiments, the software-defined network overlay capability enables at least one controller to program at least one forwarding element on the specific encapsulation or decapsulation operations to be applied to a certain flow. The controller can further tell the forwarding element to apply different encapsulation or decapsulation operations to each flow and thereby enforce network-wide traffic management via flow-based tunneling with fine granularity.

In at least one embodiment, the software-defined network overlay capability enables at least one controller to select at least one forwarding element from a set of forwarding elements for programming the specific encapsulation or decapsulation operations to be applied to a certain flow by the selected forwarding element.

In at least some embodiments, the software-defined network overlay capability is applied to encapsulation and decapsulation operations on top of IP by enabling addition and removal of headers carried below the outer IP header of the packet. This permits tunnels to stretch across a large scale, e.g., across a telecommunication service provider network, across multiple telecommunication service provider networks, or even across the entire Internet.

It will be appreciated that, while the software-defined network overlay capability may be applied to any communication system configured to support use of an overlay network(s) defined over communication infrastructure, the software-defined network overlay capability, for purposes of clarity in describing various aspects of the software-defined network overlay capability, is primarily depicted and described herein within the context of a Long Term Evolution (LTE) Evolved Packet Core (EPC) network configured to use the software-defined network overlay capability.

FIG. 1 depicts an exemplary communication system configured to support a software-defined overlay network.

The exemplary communication system 100 includes a modified LTE EPC network, in which a typical LTE EPC network has been modified to support a software-defined overlay network.

The exemplary communication system 100 includes an Evolved—Universal Mobile Telecommunications System (UMTS) Terrestrial Radio Access Network (E-UTRAN) 110, a Mobility Management Entity (MME) 120, a Home subscriber Server (HSS) 130, a Policy and Charging Rules Function (PCRF) 140, a Control Element (CE) 150 including a Serving Gateway (SGW) Function 151 and a Packet Data Network (PDN) Gateway (PGW) Function 152, a pair of Forwarding Elements (FEs) $160_1$ and $160_2$ (collectively, FEs 160), and a communication network 170. The typical operation of E-UTRAN 110, MME 120, HSS 130, and PCRF 140 within an LTE EPC network will be understood by one skilled in the art.

The exemplary communication system 100, as noted above, is a modified LTE EPC network. It will be appreciated that a typical LTE EPC network includes a Serving Gateway (SGW) and a Packet Data Network (PDN) Gateway (PGW). In exemplary communication system 100, the SGW is split into a control-plane function (illustratively, SGW Function 151 of CE 150) and a user-plane function (illustratively, FE $160_1$, which is disposed between E-UTRAN 110 and FE $160_2$). Similarly, in exemplary communication system 100, the PGW is split into a control-plane function (illustratively, PGW Function 152 of CE 150) and a user-plane function (illustratively, FE $160_2$, which is disposed between FE $160_1$ and communication network 170.

The exemplary communication system 100 includes various interfaces supporting communications between elements of exemplary communication system 100. The E-UTRAN 110 and the MME 120 are configured to communicate via an S1-MME interface. The MME 120 and the HSS 130 are configured to communicate via an S6a interface. The MME 120 and the CE 150 are configured to communicate via an S11 interface, and the PCRF 140 and the CE 150 are configured to communicate via a Gx interface. The E-UTRAN 110 and the FE 160₁ associated with SGW Function 150₁ are configured to communicate via an S1-U interface, FE 160₁ associated with SGW Function 150₁ and the FE 160₂ associated with PGW Function 150₂ are configured to communicate via an S5-U interface, and the FE 160₂ associated with PGW Function 150₂ and the communication network 170 are configured to communicate via an SGi interface. In the exemplary communication system 100 of FIG. 1, the CE 150 and the FEs 160 are configured to communicate via a modified OpenFlow interface (denoted in FIG. 1 as xOF).

The CE 150 and FEs 160 may be configured to cooperate to provide an SDN-based implementation of tunneling functions typically provided by the SGW and PGW in an EPC network.

The CE 150 and FEs 160 may be configured to cooperate to provide tunneling for data flows of exemplary communication system 100.

The CE 150 and FEs 160 may be configured to cooperate to provide for a given data flow, movement of the data flow with respect to one or more overlay networks (or tunnels). For example, the CE 150 may be configured to determine, for a given data flow, whether the data flow is to be moved into a tunnel (e.g., moved from native forwarding infrastructure into an overlay network via encapsulation of the packets of the data flow, moved from a first overlay network into a second overlay network via encapsulation of the packets of the data flow, or the like), between tunnels (e.g., removed from a first overlay network via decapsulation of the packets of the data flow and then moved into a second overlay network via encapsulation of the packets of the data flow, or the like), moved out of a tunnel (e.g., removed from an overlay network via decapsulation of the packets of the data flow when the data flow still remains within one or more other overlay networks, moved from an overlay network to native forwarding infrastructure via decapsulation of the packets of the data flow, or the like), or the like, as well as various combinations thereof.

The CE 150 may be configured to control movement of the data flow with respect to one or more overlay networks (or tunnels) and the FEs 160 may be configured to perform movement of the data flow with respect to one or more overlay networks (or tunnels) under the control of the CE 150. The CE 150 may be configured, for a given data flow, to control application of tunneling actions for the data flow in order to control movement of the data flow with respect to one or more overlay networks.

The CE 150 may be configured to receive information associated with a given data flow. The information may include any information suitable for use in triggering the CE 150 to instruct the FEs 160 to perform one or more tunneling actions for the data flow. The information associated with the data flow may include application-related information for one or more applications. For example, in an SDN including three layers as follows Application->network OS->forwarding infrastructure, the FEs 160 may be implemented as part of the forwarding infrastructure layer, the CE 150 may be implemented as part of the network OS layer, and the application may be implemented using an interface (e.g., an Operations, Administration, and Maintenance (OAM) interface or any other suitable type of interface) to the CE 150. In the exemplary communication system 100, for example, the application could reside on MME 120 and instruct the CE 150 install an Evolved Packet System (EPS) bearer (to support a data flow) on behalf of a subscriber associated with E-UTRAN 110. In this example, the application also may provide information associated with the EPS bearer (or data flow) to the CE 150 (e.g., the tunnel endpoint identifier (TEID), subscriber IP addresses, or the like). In this example, the CE 150 may translate the information associated with the EPS bearer (or data flow) into the corresponding data flow definition and tunneling action(s) associated with the data flow definition. As another example, it is noted that the CE 150 may be integrated as part of MME 120, in which case the MME 120/CE 150 receives S1-MME messages through an application interface and takes appropriate action based upon the S1-MME messages (e.g., to install EPS bearers (to support associated data flows) on behalf of subscribers associated with E-UTRAN 110. The CE 150 may be configured to support one or more such interfaces for receiving information associated with data flows.

The CE 150 may be configured, for a given data flow, to identify the FE(s) 160 which are to perform tunneling actions for packets of the data flow. This may include identification of one or more tunnels associated with the data flow, which may include tunnels to be created to support the data flow, existing tunnels supporting the data flow, or the like, as well as various combinations thereof. The identification of a tunnel may include identification of nodes which are expected to function as or which are currently functioning as endpoints of the tunnel. The identification of a tunnel may be based on identification of the tunnel endpoints (e.g., FEs 160) for the tunnel. It will be appreciated that, within the context of an overlay network utilizing tunneling for transport of packets of the data flow, the data flow may be transported via a single tunnel or via a concatenation of two or more tunnels).

For example, when the data flow is transported via a single tunnel, CE 150 may identify the two FEs 160 which are to function as the tunnel endpoints of the tunnel for the data flow (e.g., where the tunnel is not yet established) or currently functioning as the tunnel endpoints of the tunnel for the data flow (e.g., where the tunnel exists) and define respective sets of control information for use by the two FEs 160 to perform encapsulation or decapsulation functions for packets of the data flow for the tunnel. In the exemplary communication system of FIG. 1, for example, CE 150 may identify FE 160₂ and FE 160₁ as the tunnel endpoints of a tunnel between the PGW and the SGW.

For example, when the data flow is transported via multiple tunnels, CE 150, for each of the multiple tunnels, may identify the two FEs 160 which are to function as the tunnel endpoints of the respective tunnel for the data flow (e.g., where the tunnel is not yet established) or currently functioning as the tunnel endpoints of the tunnel for the data flow (e.g., where the tunnel exists) and define respective sets of control information for use by the two FEs 160 to perform encapsulation or decapsulation functions for packets of the data flow of the respective tunnel. In the exemplary communication system of FIG. 1, for example, CE 150 may identify FE 160₂ and FE 160₁ as the tunnel endpoints of a first tunnel between the PGW and the SGW and may identify FE 160₁ and another FE within E-UTRAN 110 (omitted for purposes of clarity) as the tunnel endpoints of a second tunnel between the SGW and an eNodeB in the E-UTRAN 110 (again, omitted for purposes of clarity).

The CE 150 may be configured, for a given data flow, to define control information for the data flow and to propagate the control information toward one or more of the FEs 160 for use by the one or more of the FEs 160 to perform one or more tunneling actions for packets of the data flow based on the control information of the data flow.

The FE 160 may be configured, for a given data flow, to apply one or more tunneling actions for the data flow in order to perform movement of the data flow with respect to one or more overlay networks.

The FE 160 may be configured, for a given data flow, to receive control information for the data flow from the CE 150, store the control information for the data flow, and use the control information for the data flow to perform tunneling actions for the data flow.

The FE 160 may be configured, for a given data flow, to receive a packet, determine a data flow with which the packet is associated, identify one or more tunneling actions associated with the data flow of the packet, and apply the one or more tunneling actions to the packet of the data flow.

The FE 160 may be configured to determine the data flow with which the packet is associated by using information from the packet (e.g., one or more header field values of one or more protocol header fields of the packet) to identify a matching data flow definition within a set of data flow records maintained at the FE 160 based on control information received from CE 150. The FE 160 may be configured to perform matching on one or more IP header fields, one or more UDP header fields, one or more GTP header fields, or the like, as well as various combinations thereof (as indicated in the description of the types of header fields which may be used to define a data flow).

The FE 160 may be configured to identify one or more tunneling associated with the data flow of the packet based on a data flow record having a data flow definition matching information from the packet (e.g., where the data flow records maintained at the FE 160 include a mapping of a data flow definition for the data flow to one or more tunneling actions to be performed for packets of the data flow).

The FE 160 may be configured to apply the one or more tunneling actions to the packet of the data flow based on processing of the one or more tunneling actions identified from the data flow record associated with the data flow.

The control information includes a data flow definition for the data flow and one or more tunneling actions to be performed for the data flow. The control information may be propagated from the CE 150 toward the FEs 160 using an SDN-based control protocol. The control information may be maintained by the FE 160 as a data flow record associated with the data flow, where the data flow record includes a mapping of the data flow definition to the one or more tunneling actions to be performed for the data flow.

The data flow definition for a data flow is configured for use by the FE 160 to identify packets of the data flow. The data flow definition may be based on one or more of an IP header, a UDP header, or a GTP header. The data flow definition may be based on one or more protocol header fields (e.g., one or more IP header fields, one or more UDP header fields, one or more GTP header fields, or the like, as well as various combinations thereof). For example, the data flow definition may be based on a five-tuple of IP header fields including source IP address, destination IP address, protocol type, source port number, and destination port number. For example, the data flow definition may be based on the source port number field and the destination port number field of a UDP header. For example, the data flow definition may be based on the tunnel endpoint identifier (TEID) field of a GTP header. The data flow definition may be based on any other suitable protocol header field or combination of protocol header fields.

The one or more tunneling actions for a data flow may include one or more encapsulation actions or one or more decapsulation actions.

The one or more encapsulation actions for a data flow may be used to move packets of the data flow into a tunnel (e.g., from native forwarding infrastructure into a tunnel, from a first tunnel into a second tunnel, or the like).

In at least some embodiments, an encapsulation action may include adding one or more protocol header fields of a protocol to packets of the data flow. In at least some embodiments, an encapsulation action may include setting one or more protocol header field values of one or more protocol header fields. In at least some embodiments, an encapsulation action may include computing a packet checksum. In at least some embodiments, an encapsulation action may include addition of a sequence number field value to a sequence number field (e.g., where the sequence number field value may be determined based on a cached sequence number field value added to a prior packet encapsulated on the same data flow. The one or more encapsulation actions for a data flow may include any other encapsulation actions suitable for use in moving packets of the data flow into a tunnel.

In at least some embodiments, an encapsulation action may include or have associated therewith information indicative of the type of encapsulation to be performed and information for use in performing the encapsulation action. For example, an encapsulation action may identify the protocol for which encapsulation is to be performed, one or more protocol header fields to be added to packets into order to encapsulate the packets, one or more header field values to be set in one or more protocol header fields to be added to packets into order to encapsulate the packets, or the like, as well as various combinations thereof. For example, an encapsulation action also may specify that computation of a packet checksum is to be performed. For example, an encapsulation action also may specify that addition of the sequence number is to be performed. In the exemplary communication system of FIG. 1, for example, the one or more encapsulation actions may specify use of one or more of IP-based encapsulation, UDP-based encapsulation, GTP-based encapsulation, or the like. For example, an IP-based encapsulation action that is communicated from the CE 150 to the FE 160 may include information indicative that IP-based encapsulation is to be performed and one or more IP header field values (e.g., one or more of a length value, a DSCP value, an identification value, a three-bit flags field value, a time-to-live (TTL) value, a source IP address, a destination IP address, or other IP header fields) to be used in the IP header that is added to the packet of the data flow. For example, a UDP-based encapsulation action that is communicated from the CE 150 to the FE 160 may include information indicative that UDP-based encapsulation is to be performed and one or more UDP header field values (e.g., one or more of a length value, a source port number, a destination port number, or other UDP header fields) to be used in the UDP header that is added to the packet of the data flow. For example, a GTP-based encapsulation action that is communicated from the CE 150 to the FE 160 may include information indicative that GTP-based encapsulation is to be performed and one or more GTP header field values (e.g., one or more of a length value, a TEID, or other GTP header fields) to be used in the GTP header that is added to the packet of the data flow. For example, a GTP-based encapsulation action that is communicated from the CE 150 to the FE 160 may include information indicative that the FE 160 is to derive a sequence number value from a cached sequence number value applied by the FE 160 to a prior packet encapsulated on the same flow. The one or more decapsulation actions for a data flow may be used to move packets of the data flow out of a tunnel (e.g., out of a tunnel without moving the packets into another tunnel, out of a first tunnel and into a second tunnel, out of a tunnel onto native forwarding infrastructure, or the like).

In at least some embodiments, a decapsulation action may include removing one or more protocol header fields of a protocol from packets of the data flow. In at least some embodiments, a decapsulation action may include removing one or more protocol header field values of one or more protocol header fields. In at least some embodiments, a decapsulation action may include verifying a packet checksum. In at least some embodiments, a decapsulation action may include verification and caching of a sequence number value of a sequence number field (e.g., where the verification may be performed by comparing the sequence number value to the cached sequence number value of a prior packet decapsulated on the same data flow). The one or more decapsulation actions for a data flow may include any other decapsulation actions suitable for use in moving packets of the data flow out a tunnel.

In at least some embodiments, a decapsulation action may include or have associated therewith information indicative of the type of decapsulation to be performed and information for use in performing the decapsulation action. For example, a decapsulation action may identify the protocol for which decapsulation is to be performed, one or more protocol header fields to be removed from packets into order to decapsulate the packets, or the like, as well as various combinations thereof. For example, a decapsulation action also may specify that verification of a packet checksum is to be performed. In the exemplary communication system of FIG. 1, for example, the one or more decapsulation actions may specify use of one or more of IP-based decapsulation, UDP-based decapsulation, GTP-based decapsulation, or the like. For example, a GTP-based decapsulation action that is communicated from the CE 150 to the FE 160 may include information indicative that the FE 160 is to verify and cache a sequence number value carried in a sequence number field of the GTP header (e.g., where verification may be performed by comparing the sequence number value to the cached sequence number value of a prior packet decapsulated on the same flow).

As described herein, a combination of one or more encapsulation actions and one or more decapsulation actions may be applied to packets of a data flow in order to move packets of the data flow between tunnels (e.g., applying one or more decapsulation actions to the packets of the data flow to decapsulate the packets from a first tunnel and then applying one or more encapsulation actions to packets of the data flow to encapsulate the packets into a second tunnel). The one or more tunneling actions for a data flow may include any other actions which may be controlled by the CE 150 and applied by one or more FE 160 to move packets of the data flow into a tunnel, between tunnels, out of a tunnel, or the like.

The operation of CE 150 and FEs 160 may be better understood by way of some examples.

For example, CE 150 and FEs 160 may be configured to support tunneling of a downstream data flow in the direction from the FE $160_2$ toward the FE $160_1$. In this example, CE 150 (1) identifies FE $160_2$ and FE $160_1$ as being the tunnel endpoints of a tunnel for the downstream data flow, (2) determines encapsulation actions to be performed by FE $160_2$ and provides the encapsulation actions and the associated data flow definition to the FE $160_2$ for use in performing encapsulation for packets of the data flow and (3) determines decapsulation actions to be performed by FE $160_1$ and provides the decapsulation actions and the associated data flow definition to the FE $160_1$ for use in performing decapsulation for encapsulated packets of the data flow that are received at FE $160_1$ from FE $160_2$. Additionally, in this example, (1) the FE $160_2$ receives the data flow definition and encapsulation actions from CE 150 and performs the encapsulation actions to encapsulate packets of the data flow when receipt of packets of the data flow is detected by FE $160_2$ and (2) the FE $160_1$ receives the data flow definition and decapsulation actions from CE 150 and performs the decapsulation actions to decapsulate encapsulated packets of the data flow when receipt of encapsulated packets of the data flow is detected by FE $160_1$.

For example, CE 150 and FE $160_2$ may be configured to support transfer of an upstream data flow between a first tunnel and a second tunnel at FE $160_2$. In this example, CE 150 (1) identifies FE $160_2$ as having the tunnel endpoints of for the first tunnel and the second tunnel used to transport the data flow, (2) determines a data flow definition for the data flow, (3) determines decapsulation actions to be performed by FE $160_2$ for removing packets of the data flow from the first tunnel, (4) determines encapsulation actions to be performed by FE $160_2$ for moving packets of the data flow into the second tunnel, and (5) provides the data flow definition and the decapsulation and encapsulation actions to the FE $160_2$ for use by the FE $160_2$ to move packets of the data flow between the first and second tunnels. Additionally, in this example, (1) the FE $160_2$ receives the data flow definition and the decapsulation and encapsulation actions from CE 150 and (2) for each packet of the data flow, receives the packet from the FE $160_1$ via the first tunnel, performs the decapsulation actions to decapsulate the packet from the first tunnel, performs the encapsulation actions to encapsulate the packet into the second tunnel, and transmits the packet upstream toward the communication network 170 via the second tunnel.

The CE 150 and FEs 160 may be configured to communicate via a control protocol. The control protocol may be any type of protocol suitable for use in an SDN. For example, the control protocol may be a control protocol that is based on the OpenFlow protocol (e.g., using a processing representation of the FE as defined by OpenFlow while also adapting the syntax used by the OpenFlow protocol and adding one or more OpenFlow messages or one or more OpenFlow message information elements), a control protocol that is based on the Forwarding and Control Element Separation (ForCES) protocol (e.g., using a processing representation of the FE as defined by the ForCES protocol while also adapting the syntax used by the ForCES protocol and adding one or more ForCES protocol messages or one or more ForCES protocol message information elements), a proprietary control protocol, or the like. A description of an exemplary extension of the OpenFlow protocol for the exemplary communication system 100 of FIG. 1 follows.

In at least some embodiments, the FE 160 may be configured to perform such functions by extending the OpenFlow representation of the FE 160 to form an extended OpenFlow protocol in which:
  (1) OpenFlow Matching: In at least some embodiments, the matching based on packet header fields is extended to include matching based on UDP header fields or GTP header fields.
  (2) OpenFlow Actions for Encapsulation: In at least some embodiments, new OpenFlow actions may be defined for IP-encapsulation, UDP-encapsulation, and GTP-encapsulation. In at least some embodiments, a combined IP-UDP-GTP-encapsulation action may be defined. It will be appreciated that the IP-encapsulation, UDP-encapsulation, and IP-UDP-GTP-encapsulation actions imply recomputation of the corresponding IP-header and UDP-header checksums and the packet length value for the IP header. It also will be appreciated that the protocol-value on the IP header may need to be set.

(3) OpenFlow Actions for Decapsulation: In at least some embodiments, new OpenFlow actions may be defined for IP-decapsulation, UDP-decapsulation, and GTP-decapsulation. In at least some embodiments, a combined IP-UDP-GTP-decapsulation action may be defined. It will be appreciated that the IP-decapsulation, UDP-decapsulation, and IP-UDP-GTP-decapsulation actions imply verification of the corresponding IP-header and UDP-header checksums, and that packets may need to be discarded when verification fails.

In at least some embodiments, the OpenFlow protocol may be extended in a manner for enabling the CE 150 to populate the FE 160 (e.g., entries of one or more FE tables of the FE 160) with the new matching conditions and the new encapsulation/decapsulation actions. The OpenFlow protocol may be extended with one or more new messages, one or more new message information elements, or the like, as well as various combinations thereof. An exemplary embodiment for extension of the OpenFlow protocol for the exemplary communication system 100 of FIG. 1 follows.

In at least some embodiments, for data flow matching performed by the FE 160, the enumeration "oxm_ofb_match_fields" may be extended with the matching field OFPXMT_OFB_GTPU_TEID, which represents the TEID of the GTP header.

In at least some embodiments, for encapsulation actions performed by the FE 160, the enumeration "ofp_action_type" can be extended with the following actions types:
  OFPAT_PUSH_IP4: pushing IPv4 header,
  OFPAT_PUSH_IP6: pushing IPv6 header,
  OFPAT_PUSH_UDP: pushing UDP header,
  OFPAT_PUSH_GTP: pushing GTP header,
  OFPAT_PUSH_IP4UDPGTP: pushing IPv4-, UPD- and GTP header, and
  OFPAT_PUSH_IP6UDPGTP: pushing IPv6-, UPD- and GTP header.

In at least some embodiments, for decapsulation actions performed by the FE 160, the enumeration "ofp_action_type" can be extended with the following actions types:
  OFPAT_POP_IP4: popping IPv4 header,
  OFPAT_POP_IP6: popping IPv6 header,
  OFPAT_POP_UDP: popping UDP header,
  OFPAT_POP_GTP: popping GTP header,
  OFPAT_POP_IP4UDPGTP: poping IPv4-, UPD- and GTP header, and
  OFPAT_POP_IP6UDPGTP: poping IPv6-, UPD- and GTP header.

In at least some embodiments, one or more encapsulation action structures for one or more encapsulation actions may include the field value(s) of the header to be pushed as follows.

For example, an IPv4 encapsulation action structure for OFPAT_PUSH_IP4 may be defined as:

```
struct ofp_action_push_ip4 {
    uint16_t type; /* OFPAT_PUSH_IP4. */
    uint16_t len; /* Length. */
    uint8_t dscp; /* DSCP value */
    uint16_t id; /* Identification value */
    uint8_t flags; /* 3-bit flags field value */
    uint8_t ttl; /* ttl value */
    uint32_t ipsrc; /* source IP address */
    uint32_t ipdst; /* destination IP address */
};
```

For example, a UDP encapsulation action structure for OFPAT_PUSH_UDP may be defined as:

```
struct ofp_action_push_udp {
    uint16_t type; /* OFPAT_PUSH_UDP. */
    uint16_t len; /* Length. */
    uint32_t portsrc; /* source port number */
    uint32_t portdst; /* destination port number */
};
```

For example, a GTP encapsulation action structure for OFPAT_PUSH_GTP may be defined as:

```
struct ofp_action_push_gtp {
    uint16_t type; /* OFPAT_PUSH_GTP. */
    uint16_t len; /* Length. */
    uint32_t TEID; /* tunnel endpoint identifier */
};
```

It will be appreciated that, although primarily depicted and described above with respect to an embodiment of an extended OpenFlow protocol using encapsulation action structures having specific header field parameters, in at least some embodiments the extended OpenFlow protocol may utilize encapsulation action structures including fewer or more (including different) header field parameters.

It will be appreciated that, although primarily depicted and described above with respect to an embodiment of an extended OpenFlow protocol using encapsulation action structures arranged in a particular manner (e.g., using specific action structure field names, arranged in specific orders, or the like), in at least some embodiments the extended OpenFlow protocol may utilize encapsulation action structures arranged in any other suitable manner.

It will be appreciated that, although primarily depicted and described above with respect to an embodiment of an extended OpenFlow protocol in which the encapsulation action structures include information for use in setting one or more header fields of the packet header(s) used for encapsulation, in at least some embodiments the extended OpenFlow protocol may be configured such that one or more header field setting action structures are defined for use in setting one or more header fields of the protocol header(s) used for encapsulation (e.g., one or more action structures are defined and used for setting one or more header fields of the protocol header(s) used for encapsulation, rather than including the header field setting actions as part of the encapsulation actions).

The use of the data flow matching fields and encapsulation/decapsulation actions for the exemplary OpenFlow-based control protocol described above may be better understood when considered within the context of the exemplary communication system 100 of FIG. 1.

In at least some embodiments, for example, using the data flow matching fields and network overlay actions of the exemplary OpenFlow-based control protocol described above, the processing by the PGW-U (FE 160₂) and the SGW-U (FE 160₁) for downlink traffic on the PGW-U (FE 160₂) may be performed as follows.

The Table 0: Entry includes the following functions to be performed:
  (1) Matching Fields: The matching fields include a five-tuple including source IP address, destination IP address, protocol type, source port number, and destination port number, and wild cards may be set to group 5-tuples that belong to the same EPS bearer.

(2) GTP Header Action: The GTP header action is pushed with a TEID field value which corresponds to the tunnel end point at the SGW-U for the EPS bearer.
(3) Metadata Action: The metadata action is set where the metadata value is set to the destination IP address of the SGW-U.
(4) GoTo Table 1 Action.

The Table 1: Entry includes the following functions to be performed:
(1) Matching Field: The Matching Field is equal to the metadata value.
(2) UDP Header Action: The UDP header action is pushed with the UDP source port value (e.g., 2152 or any other appropriate value).
(3) IPv4 or IPv6 Header Action: The IPv4 or IPv6 header action is pushed where the IP address is set to the metadata value (e.g., the IP address of the SGW-U) and the source IP address is set to that of the output port used to forward data to the destination address.
(4) Output Action: The output action specifying the corresponding output port automatically pushes the local Ethernet address.

In at least some embodiments, for example, using the data flow matching fields and network overlay actions of the exemplary OpenFlow-based control protocol described above, the processing by the PGW-U (FE $160_2$) and the SGW-U (FE $160_1$) for downlink traffic on the SGW-U (FE $160_1$) may be performed as follows.

The Table 0: Entry includes the following functions to be performed:
(1) Matching Fields: The matching fields include the GTP TEID of the EPS bearer at the SGW-U.
(2) Metadata: The metadata is set to the TEID value of the bearer endpoint at the eNodeB.
(3) GTP Header Action: The GTP Header Action is popped with the TEID field value.
(4) UDP Header Action: The UDP Header Action is popped.
(5) IP Header Action: The IP Header Action is popped.
(6) Metadata Action: The Metadata Action is set where the metadata value is set to the destination IP address of the eNodeB.
(7) GoTo Table 1 Action.

The Table 1: Entry includes the following functions to be performed:
(1) Matching Field: The Matching Field is equal to the metadata value.
(2) UDP Header Action: The UDP header action is pushed with the UDP source port value (e.g., 2152 or any other appropriate value).
(3) IPv4 or IPv6 Header Action: The IPv4 or IPv6 header action is pushed where the IP address is set to the metadata value (e.g., the IP address of the eNodeB) and the source IP address is set to that of the output port used to forward data to the destination address.
(4) Output Action: The output action specifying the corresponding output port automatically pushes the local Ethernet address.

It will be appreciated that, since the FEs 160 may perform the same or similar functionality, the anchors to which a UE is attached (e.g., the SGW-U (FE $160_1$) and PGW-U (FE $160_2$)) may be placed and migrated freely within the exemplary communication network 100, thereby enabling flexible and optimized routing, early breakout, integration of cache servers (e.g., Content Delivery Network (CDN) functions) closer to the UE, or the like, as well as various combinations thereof.

As described herein, embodiments of the software-defined network overlay capability may be applied to support various types of tunneling within an LTE EPC network. An exemplary use of the software-defined network overlay capability to support UDP-based and GTP-based tunneling within the context of exemplary communication network 100 is depicted and described with respect to FIG. 2.

Figure 2:
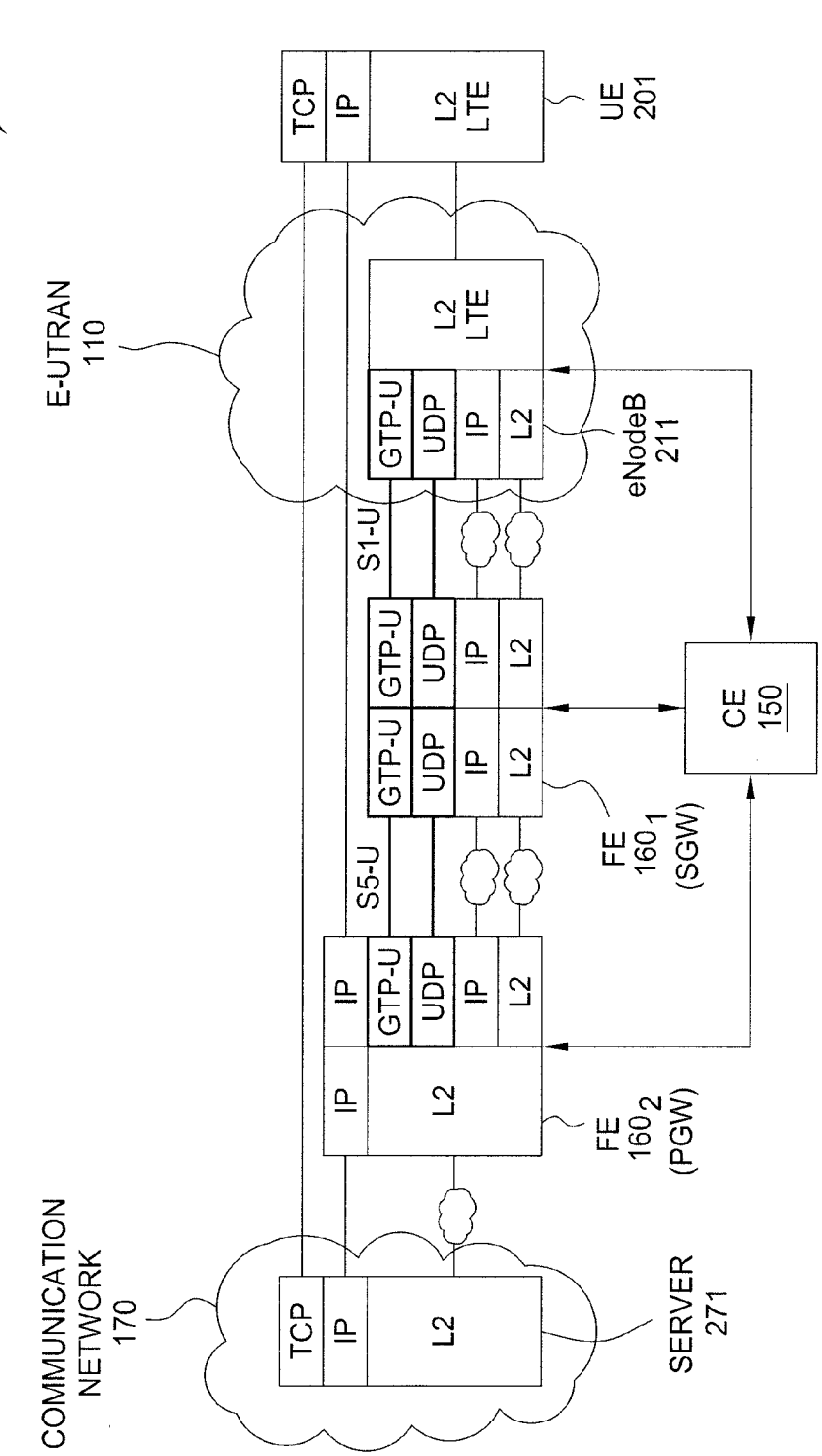
FIG. 2 depicts exemplary tunneling between elements of the exemplary communication system of FIG. 1.

FIG. 2 depicts exemplary tunneling between elements of the exemplary communication system of FIG. 1.

As depicted in FIG. 2, exemplary communication system 200 of FIG. 2 is an LTE EPC network. The exemplary communication system 200 of FIG. 2 supports end-to-end communication between a User Equipment (UE) 201 associated with an eNodeB 211 of E-UTRAN 110 and a server 271 of communication network 170, where communication between E-TRAN 110 and communication network 170 is via FE $160_1$ (associated with an SGW) and FE $160_2$ (associated with a PGW). The arrangement of the elements of the exemplary communication system 200 of FIG. 2 may be better understood by way of reference to the exemplary communication system 100 of FIG. 1.

As depicted in FIG. 2, communication between elements of exemplary communication system 200 is performed using various communication protocols at various communication layers. The elements of exemplary communication system 200 each support one or more protocol stacks, supporting communication protocols for communication at various layers of the OSI model (e.g., physical layer, data link layer, network layer, transport layer, and the like). The end-to-end communication between server 271 and UE 211 is via a TCP connection. The TCP connection is transported via an IP-based connection between server 271 and FE $160_2$ and an IP-based connection between FE $160_2$ and UE 201. The IP-based connection between server 271 and FE $160_2$ is transported via an L2 connection between server 271 and FE $160_2$. The IP-based connection between FE $160_2$ and UE 201 is transported via various connections between FE $160_2$ and FE $160_1$, various connections between FE $160_1$ and eNodeB 211, and an L2 LTE connection between eNodeB 211 and UE 201. The various connections between FE $160_2$ and FE $160_1$ include a GTP-U (S5-U interface) connection, which is transported via a UDP connection, which is transported via an IP connection, which is transported via an L2 connection. Similarly, the various connections between FE $160_1$ and eNodeB 211 include a GTP-U (S1-U interface) connection, which is transported via a UDP connection, which is transported via an IP connection, which is transported via an L2 connection. The typical configuration of communication protocols within an LTE EPC network will be understood by one skilled in the art and, thus, further descriptions of the various connections between the various elements are omitted. Additionally, lower layer protocols/connections (e.g., physical layer) and high layer protocols/connections (e.g., presentation layer, application layer, or the like) also are omitted for purposes of clarity.

As further depicted in FIG. 2, exemplary communication system 200 is configured to support SDN-based tunneling both between FE $160_2$ and FE $160_1$ and between FE $160_1$ and eNodeB 211 (indicated by the thicker boxes associated with these protocols/connections in FIG. 2). In the downstream direction for a given data flow, under the control of the CE 150, the following functions are performed: (1) FE $160_2$ identifies IP packets of the data flow, encapsulates the IP packets using UDP to form UDP packets (UDP tunnel), further encapsulates the UDP packets using GTP-U to form GTP-U packets (such that the UDP tunnel is a tunnel within the GTP-U tunnel), and propagates the GTP-U packets toward FE $160_1$, (2) FE $160_1$ receives the GTP-U packets from FE $160_2$, identifies the GTP-U packets of the data flow, decapsulates the GTP-U packets to recover the UDP packets, decapsulates the UDP packets to recover the IP packets, encapsulates the IP packets using UDP to form UDP packets (UDP tunnel), further encapsulates the UDP packets using GTP-U to form GTP-U packets (such that the UDP tunnel is a tunnel within the GTP-U tunnel), and propagates the GTP-U packets toward eNodeB 211; and (3) eNodeB 211 receives the GTP-U packets from FE $160_1$, identifies the GTP-U packets of the data flow, decapsulates the GTP-U packets to recover the UDP packets, and decapsulates the UDP packets to recover the IP packets. It will be appreciated that other associated actions are performed, although descriptions of such actions are omitted as such actions are not under the control of CE 150. It will be appreciated that, in the upstream direction for a given data flow, CE 150, eNodeB 211, FE $160_1$, and FE $160_2$ may be configured to perform complementary functions for supporting tunneling of packets in the upstream direction.

As described herein, embodiments of the software-defined network overlay capability also may be applicable to various types of overlay networks in addition to the LTE EPC network depicted and described with respect to FIG. 1. For example, embodiments of the software-defined network overlay capability also may be applied to support tunneling within a Virtual Private Network (VPN) context. An exemplary use of the software-defined network overlay capability to support UDP-based and ESP-based tunneling within the context of an exemplary VPN is depicted and described with respect to FIG. 3.

Figure 3:
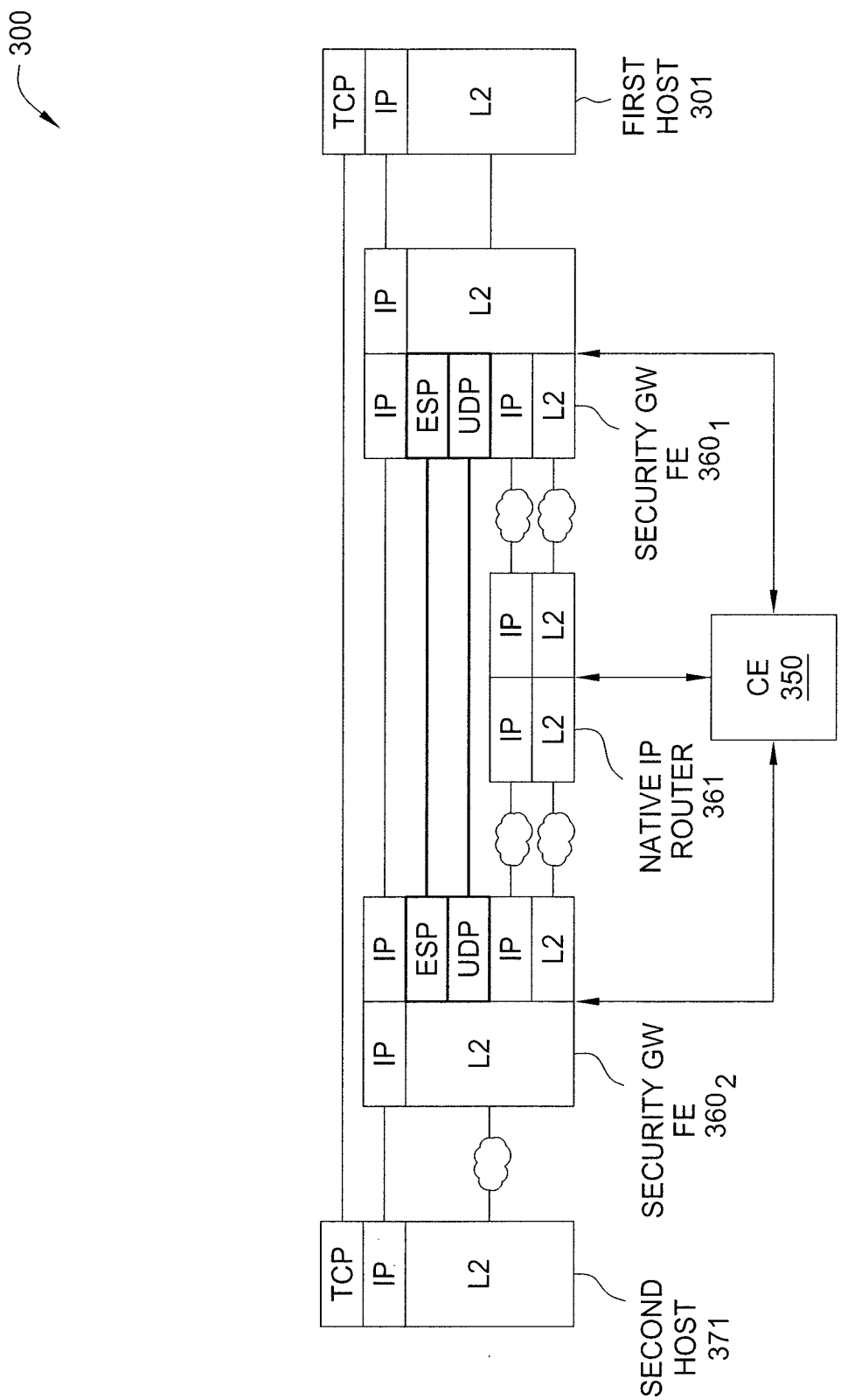
FIG. 3 depicts exemplary tunneling between elements of an exemplary communication system.

FIG. 3 depicts exemplary tunneling between elements of an exemplary communication system.

As depicted in FIG. 3, exemplary communication system 300 of FIG. 3 is a communication network supporting a Virtual Private Network (VPN). The exemplary communication system 300 of FIG. 3 supports end-to-end communication between a first host 301 associated with a first security gateway (security gateway FE $360_1$) and a second host 371 associated with a second security gateway (security gateway FE $360_2$), where communication between security gateway FE $360_1$ and security gateway FE $360_2$ is via a native IP router 361. The arrangement of the elements of the exemplary communication system 300 of FIG. 3 is similar to the arrangement of the elements of exemplary communication system 200 of FIG. 2.

As depicted in FIG. 3, communication between elements of exemplary communication system 300 is performed using various communication protocols at various communication layers. The elements of exemplary communication system 300 each support one or more protocol stacks, supporting communication protocols for communication at various layers of the OSI model (e.g., physical layer, data link layer, network layer, transport layer, and the like). The end-to-end communication between second host 371 and first host 301 is via a TCP connection. The TCP connection is transported via an IP-based connection between second host 371 and security gateway FE $360_2$, an IP-based connection between security gateway FE $360_2$ and security gateway FE $360_1$, and an IP-based connection between security gateway FE $360_1$ and first host 301. The IP-based connection between second host 371 and security gateway FE $360_2$ is transported via an L2 connection between second host 371 and security gateway FE $360_2$ and, similarly, the IP-based connection between security gateway FE $360_1$ and first host 301 is transported via an L2 connection between security gateway FE $360_1$ and first host 301. The IP-based connection between security gateway FE $360_2$ and security gateway FE $360_1$ is transported/secured via an ESP connection (of the IPSec protocol quite), which is transported via a UDP connection, which is transported via IP connections (between security gateway FE $360_2$ and native IP router 361 and between native IP router 361 and security gateway FE $360_1$), which are transported via L2 connections (again, between security gateway FE $360_2$ and native IP router 361 and between native IP router 361 and security gateway FE $360_1$, supporting the respective IP connections). The typical configuration of communication protocols within a VPN network will be understood by one skilled in the art and, thus, further descriptions of the various connections between the various elements are omitted. Additionally, lower layer protocols/connections (e.g., physical layer) and high layer protocols/connections (e.g., presentation layer, application layer, or the like) also are omitted for purposes of clarity.

As further depicted in FIG. 3, exemplary communication system 300 is configured to support SDN-based tunneling between security gateway FE $360_2$ and security gateway FE $360_1$ (indicated by the thicker boxes associated with these protocols/connections in FIG. 3). In a first direction for a given data flow (illustratively, left to right across FIG. 3), under control of CE 350, various functions are performed. The CE 350 specifies to security gateway FE $360_2$ and security gateway FE $360_1$ the flows that should be secured via ESP (e.g., CE 350 may specify packets pertaining to a flow that enters security gateway FE $360_2$ via a 5-tuple including IP addresses, transport protocol type, and port numbers and, further, CE 350 may specify a flow that enters FE $360_1$ via an SPI parameter included in the ESP header). The CE 350 specifies to security gateway FE $360_2$ and security gateway FE $360_1$ keying material, encryption algorithms, and authentication algorithms which pertain to the flow and which are to be used for ESP encapsulation (by FE $360_2$) and ESP decapsulation (by FE $360_1$). The security gateway FE $360_2$ identifies IP packets of the data flow, encapsulates the IP packets using UDP to form UDP packets (UDP tunnel), further encapsulates the UDP packets using ESP to form ESP packets (such that the UDP tunnel is a tunnel within the ESP tunnel) by using the appropriate keying material, encryption, and authentication algorithms associated with this data flow, and propagates the ESP packets toward security gateway FE $360_1$ (using further IP encapsulation which is not under the control of CE 350). The security gateway FE $360_1$ receives the ESP packets from security gateway FE $160_2$, identifies the ESP packets of the data flow, decapsulates the ESP packets to recover the UDP packets by using the appropriate keying material, encryption, and authentication algorithms associated with this data flow, and decapsulates the UDP packets to recover the IP packets. It will be appreciated that other associated actions are performed, although descriptions of such actions are omitted as such actions are not under the control of CE 350. It will be appreciated that one skilled in the art may identify other manners of traffic selection for ESP encapsulation (e.g., such as described in RFC 4301 or the like). It will be appreciated that one skilled in the art may identify other manners of forwarding security association between CE 350 and security gateways FE $360_2$ and FE $360_1$ (e.g., such as described in RFC 4301 or the like). It will be appreciated that, in the upstream direction for a given data flow, CE 350, security gateway FE $360_1$, and security gateway FE $360_2$ may be configured to perform complementary functions for supporting tunneling of packets in the upstream direction.

As described herein, embodiments of the software-defined network overlay capability also may be applicable to various types of tunneling in various types of overlay networks. In at least some other types of overlay networks, tunneling actions may be performed for one or more of the types of protocols (e.g., in place of or in addition to one or more of IP, UDP, and GTP), for one or more other traffic types (e.g., in place of or in addition to user data flows), or the like. Examples of protocols which may be used to provide an overlay network include IPv4, IPv6, IPv6 Extension Headers, GRE, GTP, UDP, TCP, SCTP, DCCP, ESP, AH, or the like. Thus, various references herein to specific tunneling actions and specific traffic types (as well as any other references specific to an LTE EPC network, a VPN, or the like) may be described more generally so as to encompass any suitable types of overlay networks for which embodiments of the software-defined network overlay capability may be applied. For example, specific references to the IP, UDP, GTP, and ESP protocols may be read more generally as including any communication protocols at the network layer or transport layer of the Open Systems Interconnection (OSI) model and, thus, may be referred to more generally herein as "network layer protocols" or "transport layer protocols". For example, specific references herein to ESP bearers and other types of user data flows may be referred to more generally herein as "data flows". Other related terms also may be read more generally as appropriate. The operation of a CE and an FE in a more general software-defined overlay network (e.g., representing any suitable type of overlay network) may be better understood by way of reference to FIG. 4 and FIG. 5, respectively.

Figure 4:
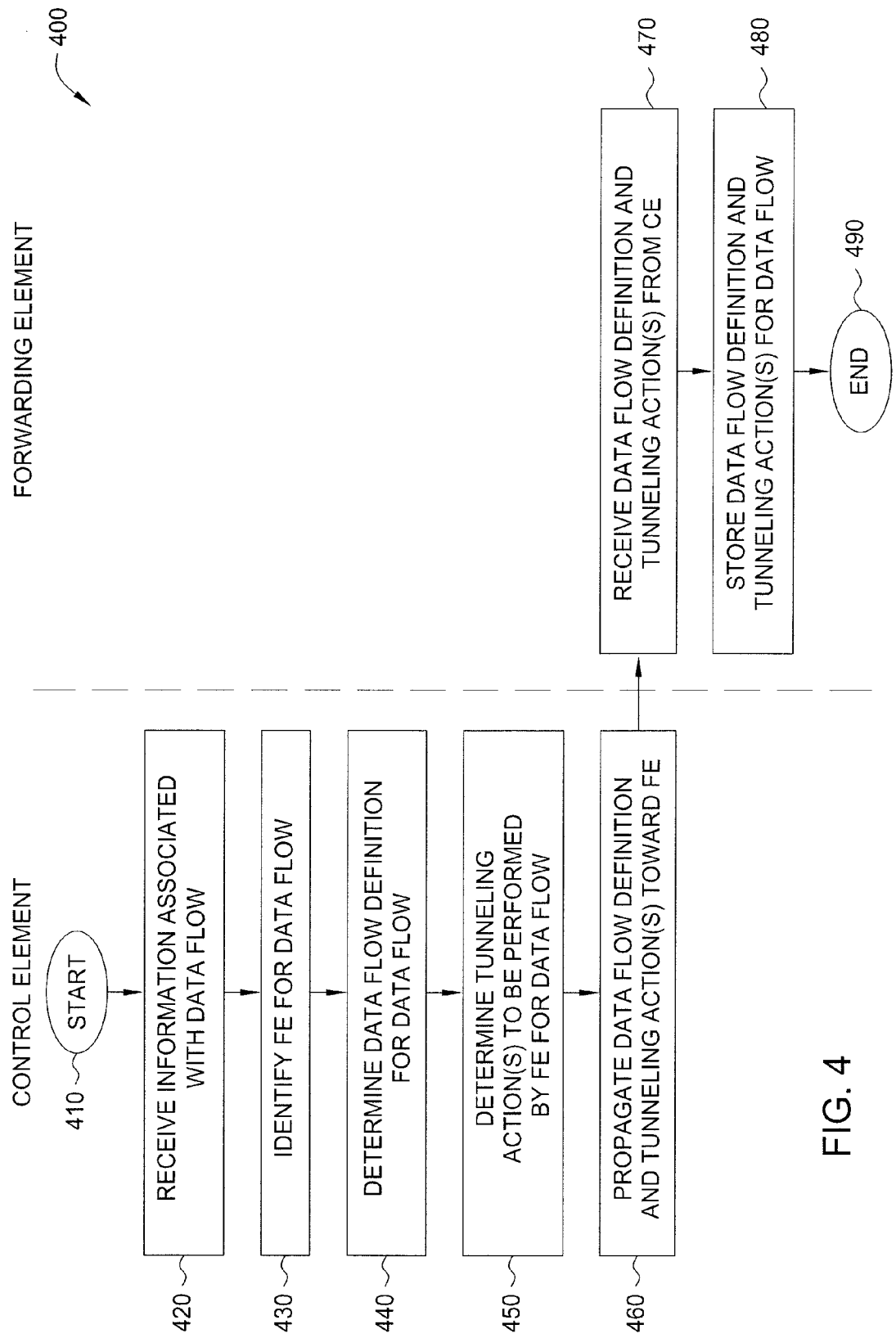
FIG. 4 depicts one embodiment of a method for use by a control element to configure a forwarding element in a software-defined overlay network.

FIG. 4 depicts one embodiment of a method for use by a control element to configure a forwarding element in a software-defined overlay network. As depicted in FIG. 4, a portion of the steps of method 400 are performed by the control element (CE) and a portion of the steps of method 400 are performed by the forwarding element (FE). It will be appreciated that, although depicted and described as being performed serially, at least a portion of the steps of method 400 may be performed contemporaneous or in a different order than depicted and described with respect to FIG. 4.

At step 410, method 400 begins.

At step 420, the CE receives information associated with the data flow. The information may include any information suitable for use in triggering the CE to instruct the FE to perform one or more tunneling actions for the data flow (which may include information suitable for use in one or more of identifying the FE for the data flow, determine the data flow definition for the data flow, or determining the one or more tunneling actions to be performed for the data flow). The information associated with the data flow may include application-related information for one or more applications. For example, in an SDN including three layers as follows: Application->network OS->forwarding infrastructure, the FE may be implemented as part of the forwarding infrastructure layer, the CE may be implemented as part of the network OS layer, and the application may be implemented using an interface (e.g., a network interface, an internal communication interface, or the like, which may depend on the implementation of the CE) to the CE (via which the CE receives the information associated with the data flow).

At step 430, the CE identifies the FE for the data flow. The identification of the FE for the data flow may be based on at least a portion of the received information associated with the data flow. The identification of the FE for the data flow may include identification of one or more tunnel endpoints of one or more tunnels for the data flow.

At step 440, the CE determines a data flow definition for the data flow. The determination of the data flow definition for the data flow may be based on at least a portion of the received information associated with the data flow. The data flow definition for the data flow may be based on one or more protocol header fields of one or more protocols.

At step 450, the CE determines one or more tunneling actions (e.g., encapsulation actions, decapsulation actions, or the like) to be performed by the FE for the data flow. The determination of the one or more tunneling actions to be performed for the data flow may be based on at least a portion of the received information associated with the data flow.

At step 460, the CE propagates the data flow definition and the one or more tunneling actions toward the FE. The propagation of the data flow definition and the one or more tunneling actions toward the FE includes initiation of propagation of the data flow definition and the one or more tunneling actions by the CE (and does not necessarily include receipt of the data flow definition and the one or more tunneling actions by the FE).

At step 470, the FE receives the data flow definition and the one or more tunneling actions from the CE. The receipt of the data flow definition and the one or more tunneling actions at the FE includes does not necessarily include propagation of the data flow definition and the one or more tunneling actions by the CE toward the FE.

At step 480, the FE stores the data flow definition and the one or more tunneling actions of the data flow. The data flow definition and one or more tunneling actions are stored such that the one or more tunneling actions are mapped to the data flow definition (e.g., such that a determination that packets received at the FE are associated with the data flow specified by the data flow definition may be used as a basis for identifying the one or more tunneling actions to be performed by the FE for the packets of the data flow).

At step 490, method 400 ends.

Figure 5:
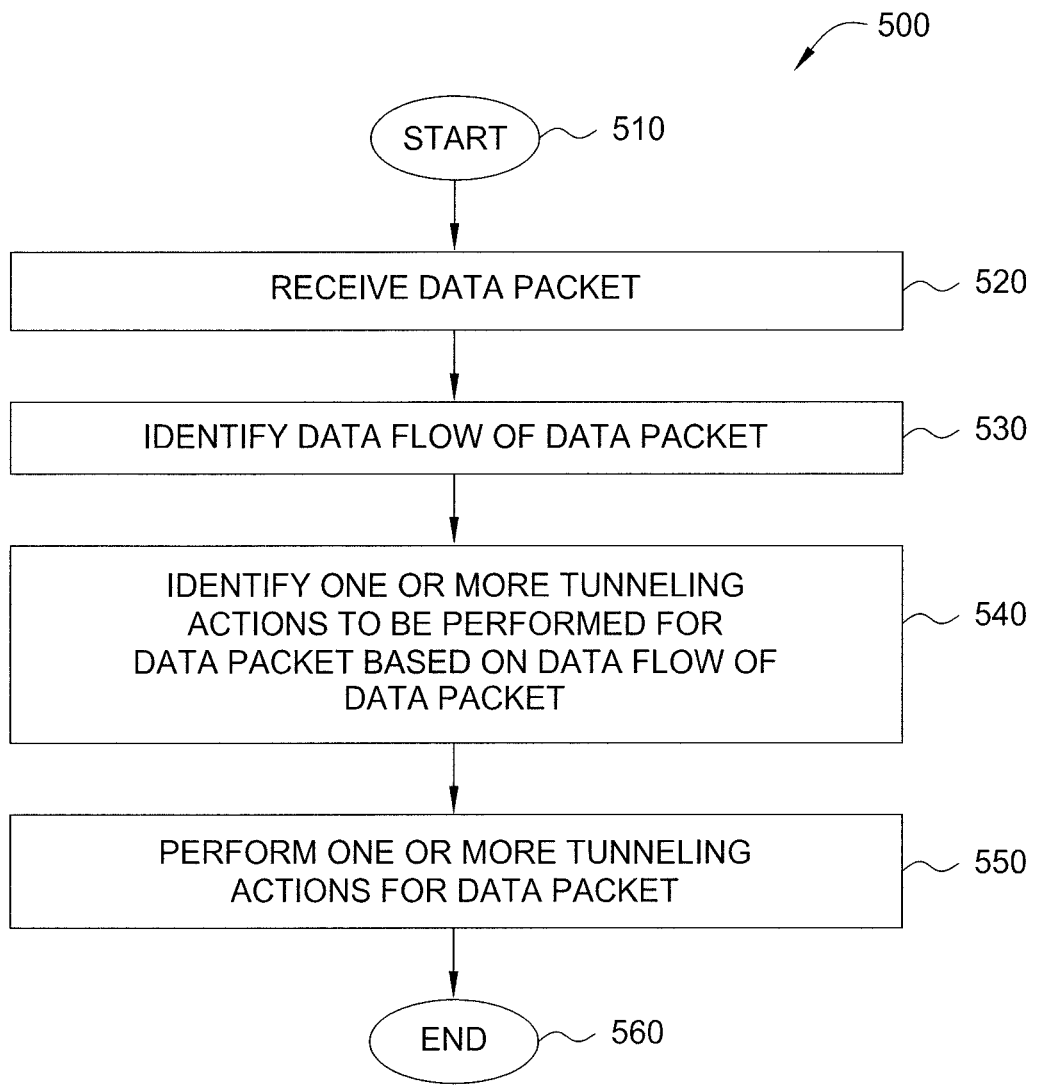
FIG. 5 depicts one embodiment of a method for use by a forwarding element to process a packet of a data flow in a software-defined overlay network.

FIG. 5 depicts one embodiment of a method for use by a forwarding element to process a packet of a data flow in a software-defined overlay network. It will be appreciated that, although depicted and described as being performed serially, at least a portion of the steps of method 500 may be performed contemporaneous or in a different order than depicted and described with respect to FIG. 5.

At step 510, method 500 begins.

At step 520, a packet is received. The packet is received at the forwarding element. The packet is associated with a data flow. The forwarding element includes a mapping of a data flow definition for the data flow to one or more tunneling actions to be performed for the data flow (e.g., based on control information for the data flow that was received at the forwarding element from an associated control element).

At step 530, the data flow of the packet is identified based on information included within the packet and the data flow definition associated with the data flow of the packet. The data flow definition for the data flow may be based on one or more protocol header fields of one or more protocols. The data flow of the data packet may be identified based on comparison of one or more values of one of one header fields (of one or more protocols) of the data packet to values associated with data flow definitions accessible to the forwarding element.

At step 540, one or more tunneling actions to be performed for the packet are identified based on the mapping of the data flow definition to the one or more tunneling actions. The one or more tunneling actions include one or more encapsulation actions or one or more decapsulation actions.

At step 550, the one or more tunneling actions are performed for the packet.

At step 560, method 500 ends.

It will be appreciated that, although primarily depicted and described herein with respect to use of a software-defined overlay network in particular types of IP-based networks (namely, an LTE EPC network, a VPN, or the like), a software-defined overlay network may be used in various other types of IP-based networks (including wireless networks or wireline networks).

It will be appreciated that, although primarily depicted and described herein with respect to use of a specific type of SDN control protocol (namely, OpenFlow) to provide an software-defined overlay network, a software-defined overlay network may be provided using any other suitable type of SDN control protocol (e.g., the FORCES protocol, a proprietary SDN control protocol, or the like).

In at least some embodiments, a software-defined overlay network enables control plane and user plane functions to evolve independently, thereby enabling the control plane and user plane functions to be optimized to their specific requirements (e.g., software-based solutions for the CE and hardware-based solutions for the FEs).

In at least some embodiments, a software-defined overlay network may utilize centralized control configured such that various control-plane functions may be merged in a manner which reduces processing and signaling overhead.

In at least some embodiments, a software-defined overlay network may utilize centralized control configured in a manner that obviates the need for distributed routing protocols, thereby improving flexibility as new routing routes may be updated quickly (e.g., in the case of user mobility).

In at least some embodiments, a software-defined overlay network may be implemented such that the forwarding elements for the overlay nodes may perform the same or similar functions and, thus may be commoditized in a manner tending to lower costs.

In at least some embodiments, a software-defined overlay network reduces or eliminates the need for additional inter-node protocols, thereby reducing the complexity of network design, operations, and maintenance.

In at least some embodiments, a software-defined overlay network alleviates the impact of the introduction of specialized nodes and inter-node protocols which typically results as feature requirements and standards evolve over time.

In at least some embodiments, a software-defined overlay network alleviates the impact of the introduction of specialized hardware to meet the continuing demands for higher performance (e.g., higher throughput) as feature requirements and standards evolve over time, thereby reducing operations expenses.

In at least some embodiments, a software-defined overlay network alleviates single points of failure in the forwarding plane that often are introduced through node specialization, thereby improving robustness.

In at least some embodiments, a software-defined overlay network enables assignment of functions to nodes based on operational considerations, rather than network topology and legacy issues, thereby enabling migrations from specialized to general-purpose hardware and function virtualization to be performed without performance degradation or at least with reduced performance degradation.

In at least some embodiments, a software-defined overlay network enables control plane and user plane resource provisioning to be performed independently (e.g., based on respective load and performance targets of the control plane and user plane).

In at least some embodiments, a software-defined overlay network enables a mobility network to be realized and operated in a more cost-efficient manner.

In at least some embodiments, a software-defined overlay network provides a comprehensive overlay solution able to satisfy requirements of different types of telecommunications operators (e.g., wireline operators and mobile operators) without restrictive tailoring of operator-specific overlay solutions that tend to result in incompatible solutions for different types of telecommunications operators.

In at least some embodiments, a software-defined overlay network provides a more efficient and lower cost solution for various types of telecommunication networks and, since the various capabilities and associated benefits of the software-defined overlay network apply to wireless and wireline networks, the software-defined overlay network may enable true wireless-wireline convergence.

Figure 6:
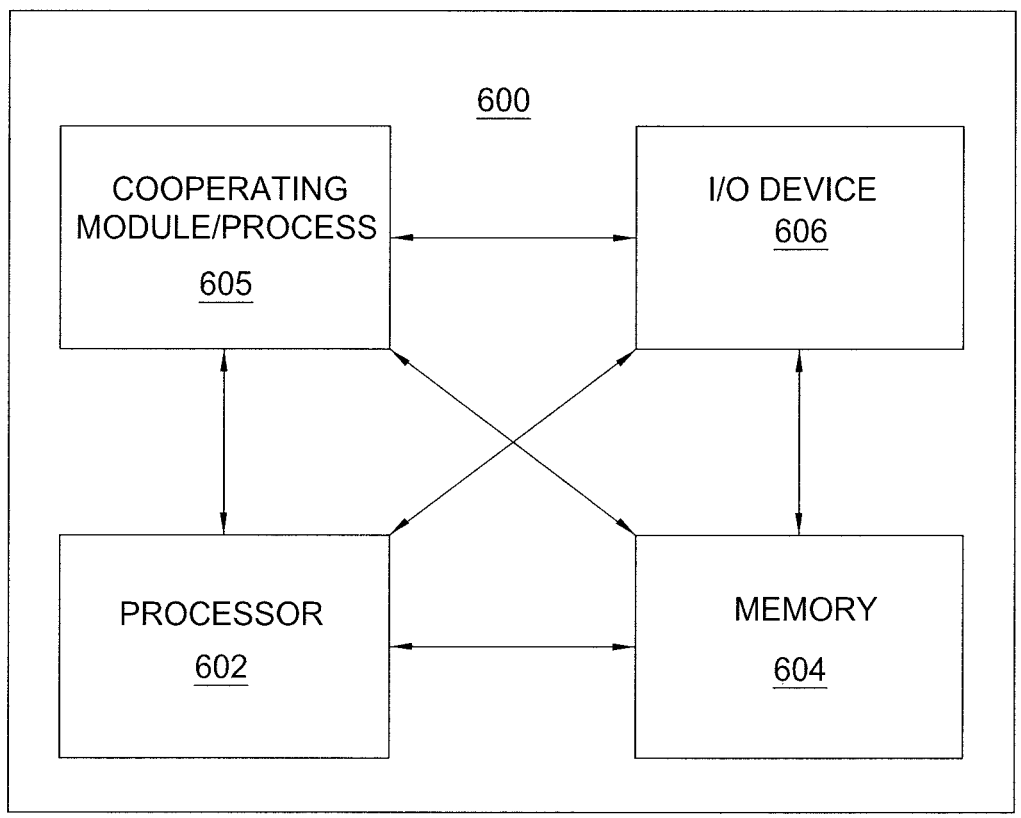
FIG. 6 depicts a high-level block diagram of a computer suitable for use in performing functions described herein.

FIG. 6 depicts a high-level block diagram of a computer suitable for use in performing functions described herein.

The computer 600 includes a processor 602 (e.g., a central processing unit (CPU) or other suitable processor(s)) and a memory 604 (e.g., random access memory (RAM), read only memory (ROM), and the like).

The computer 600 also may include a cooperating module/process 605. The cooperating process 605 can be loaded into memory 604 and executed by the processor 602 to implement functions as discussed herein and, thus, cooperating process 605 (including associated data structures) can be stored on a computer readable storage medium, e.g., RAM memory, magnetic or optical drive or diskette, and the like.

The computer 600 also may include one or more input/output devices 606 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 600 depicted in FIG. 6 provides a general architecture and functionality suitable for implementing functional elements described herein or portions of functional elements described herein. For example, the computer 600 provides a general architecture and functionality suitable for implementing one or more of one or more elements of E-UTRAN 110, all or part of MME 120, all or part of HSS 130, all or part of PCRF 140, all or part of CE 150, all or part of FE 160, one or more elements of communication network 170, all or part of UE 201, all or part of server 271, all or part of first host 301, all or part of CE 350, all or part of security gateway 360$_1$, all or part of security gateway 360$_2$, all or part of native IP router 361, all or part of second host 371, or the like. In at least some embodiments, at least a portion of the functions of the control element (e.g., CE 150, CE 350, or the like) may be implemented on one or more general-purpose processors so as to provide a special-purpose processor configured to perform functions of the control element.

It will be appreciated that the functions depicted and described herein may be implemented in software (e.g., via implementation of software on one or more hardware processors, for executing on a general purpose computer (e.g., via execution by one or more processors) so as to implement a special purpose computer, and the like) or may be implemented in hardware (e.g., using a general purpose computer, one or more application specific integrated circuits (ASIC), and/or any other hardware equivalents).

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or," unless otherwise indicated (e.g., "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
determine a data flow definition for a data flow, wherein the data flow definition is based on one or more protocol header fields of one or more protocols, wherein the one or more protocols comprise one or more network layer protocols or one or more transport layer protocols;
determine a set of actions to be performed for the data flow at a forwarding element, wherein the set of actions comprises at least one tunneling action and at least one security action, wherein the at least one tunneling action comprises at least one of a set of multiple encapsulation actions or a set of multiple decapsulation actions, wherein the at least one security action is associated with a security protocol and comprises at least one of an encryption action or a decryption action;
wherein the set of multiple encapsulation actions comprises a tunneling encapsulation action, a transport layer encapsulation action, and a network layer encapsulation action;
wherein the set of multiple decapsulation actions comprises a network layer decapsulation action, a transport layer decapsulation action, and a tunneling decapsulation action; and
propagate, toward the forwarding element, control information indicative of the data flow definition and the set of actions.

2. The apparatus of claim 1, wherein the processor is configured to:
receive information associated with the data flow; and
determine, based on the information associated with the data flow, at least one of the data flow definition or the set of actions.

3. The apparatus of claim 1, wherein the processor is configured to:
identify the forwarding element toward which the control information is propagated.

4. The apparatus of claim 1, wherein the at least one tunneling action is configured for at least one of moving packets of the data flow into a tunnel, moving packets of the data flow between tunnels, or moving packets of the data flow out of a tunnel.

5. The apparatus of claim 1, wherein the at least one tunneling action is configured for at least one of moving packets of the data flow from native forwarding infrastructure into a tunnel or moving packets from a tunnel to native forwarding infrastructure.

6. The apparatus of claim 1, wherein the at least one tunneling action comprises the set of encapsulation actions, wherein the control information comprises an indication of a protocol to be used to encapsulate packets of the data flow and an indication of at least one protocol header field to be used to encapsulate packets of the data flow.

7. The apparatus of claim 6, wherein the control information further comprises at least one protocol header field value to be set for the at least one protocol header field.

8. The apparatus of claim 6, wherein the control information further comprises at least one of an indication that computation of a packet checksum is to be performed or an indication that packet sequence numbers are to be added to packets of the data flow.

9. The apparatus of claim 1, wherein the at least one tunneling action comprises the set of decapsulation actions, wherein the control information comprises an indication of a protocol from which packets of the data flow are to be decapsulated.

10. The apparatus of claim 9, wherein the control information further comprises at least one of an indication that verification of a packet checksum is to be performed or an indication that packet sequence numbers are to be verified.

11. A method, comprising:
using a processor and a memory for:
determining a data flow definition for a data flow, wherein the data flow definition is based on one or more protocol header fields of one or more protocols, wherein the one or more protocols comprise one or more network layer protocols or one or more transport layer protocols;
determining a set of actions to be performed for the data flow at a forwarding element, wherein the set of actions comprises at least one tunneling action and at least one security action, wherein the at least one tunneling action comprises at least one of a set of multiple encapsulation actions or a set of multiple decapsulation actions, wherein the at least one security action is associated with a security protocol and comprises at least one of an encryption action or a decryption action;
wherein the set of multiple encapsulation actions comprises a tunneling encapsulation action, a transport layer encapsulation action, and a network layer encapsulation action;
wherein the set of multiple decapsulation actions comprises a network layer decapsulation action, a transport layer decapsulation action, and a tunneling decapsulation action; and
propagating, toward the forwarding element, control information indicative of the data flow definition and the set of actions.

12. An apparatus, comprising:
a processor and a memory communicatively connected to the processor, the processor configured to:
receive, at a forwarding element from a control element, control information comprising a data flow definition for a data flow and a set of actions to be performed for the data flow at the forwarding element, wherein the data flow definition is based on one or more protocol header fields of one or more protocols, wherein the one or more protocols comprise one or more network layer protocols or one or more transport layer protocols, wherein the set of actions comprises at least one tunneling action and at least one security action, wherein the at least one tunneling action comprises at least one of a set of multiple encapsulation actions or a set of multiple decapsulation actions, wherein the at least one security action is associated with a security protocol and comprises at least one of an encryption action or a decryption action;

wherein the set of multiple encapsulation actions comprises a tunneling encapsulation action, a transport layer encapsulation action, and a network layer encapsulation action;

wherein the set of multiple decapsulation actions comprises a network layer decapsulation action, a transport layer decapsulation action, and a tunneling decapsulation action; and process a packet of the data flow based on the control information.

13. The apparatus of claim 12, wherein the processor is configured to process the packet of the data flow based on the control information by:

identifying the data flow with which the packet is associated based on information included within the packet and the data flow definition of the data flow;

identifying the at least one tunneling action to be performed for the data flow based on a mapping of the data flow definition to the at least one tunneling action; and performing the at least one tunneling action for the packet of the data flow.

14. The apparatus of claim 12, wherein the at least one tunneling action is configured for at least one of moving packets of the data flow into a tunnel, moving packets of the data flow between tunnels, or moving packets of the data flow out of a tunnel.

15. The apparatus of claim 12, wherein the at least one tunneling action is configured for at least one of moving packets of the data flow from native forwarding infrastructure into a tunnel or moving packets from a tunnel to native forwarding infrastructure.

16. The apparatus of claim 12, wherein the at least one tunneling action comprises the set of encapsulation actions, wherein the control information comprises an indication of a protocol to be used to encapsulate packets of the data flow and an indication of at least one protocol header field to be used to encapsulate packets of the data flow.

17. The apparatus of claim 16, wherein the control information further comprises at least one protocol header field value to be set for the at least one protocol header field.

18. The apparatus of claim 16, wherein the control information further comprises at least one of an indication that computation of a packet checksum is to be performed or an indication that packet sequence numbers are to be added to packets of the data flow.

19. The apparatus of claim 12, wherein the at least one tunneling action comprises the set of decapsulation actions, wherein the control information comprises an indication of a protocol from which packets of the data flow are to be decapsulated.

20. The apparatus of claim 19, wherein the control information comprises at least one of an indication that verification of a packet checksum is to be performed or an indication that packet sequence numbers are to be verified.

21. A method, comprising:

using a processor and a memory for:

receiving, at a forwarding element from a control element, control information comprising a data flow definition for a data flow and a set of actions to be performed for the data flow at the forwarding element, wherein the data flow definition is based on one or more protocol header fields of one or more protocols, wherein the one or more protocols comprise one or more network layer protocols or one or more transport layer protocols, wherein the set of actions comprises at least one tunneling action and at least one security action, wherein the at least one tunneling action comprises at least one of a set of multiple encapsulation actions or a set of multiple decapsulation actions, wherein the at least one security action is associated with a security protocol and comprises at least one of an encryption action or a decryption action;

wherein the set of multiple encapsulation actions comprises a tunneling encapsulation action, a transport layer encapsulation action, and a network layer encapsulation action;

wherein the set of multiple decapsulation actions comprises a network layer decapsulation action, a transport layer decapsulation action, and a tunneling decapsulation action; and processing a packet of the data flow based on the control information.

* * * * *